United States Patent
Bystron

[11] 3,797,341
[45] Mar. 19, 1974

[54] METHOD OF AND APPARATUS FOR CUTTING TEXTILE MATERIAL

[75] Inventor: Bruno Bystron, Ingolstadt, Germany

[73] Assignee: Schubert & Salzer Maschinenfabrik Aktiengesellschaft, Ingolstadt, Germany

[22] Filed: Jan. 11, 1973

[21] Appl. No.: 322,698

Related U.S. Application Data

[63] Continuation-in-part of Ser. No. 80,905, Oct. 15, 1970, abandoned.

[30] Foreign Application Priority Data
Oct. 21, 1969 Germany.......................... 1952852

[52] U.S. Cl.............................. 83/14, 83/56, 83/422, 83/451, 83/925 CC, 269/21
[51] Int. Cl. ... B26d 1/10, B23d 55/04, A41h 43/00
[58] Field of Search......... 83/451, 374, 925 CC, 14, 83/13, 56, 422; 269/21

[56] References Cited
UNITED STATES PATENTS
3,495,492  2/1970  Gerber et al...................... 83/451 X Primary Examiner—J. M. Meister
Attorney, Agent, or Firm—Robert W. Beach

[57] ABSTRACT

A flimsy sealing surface sheet of silk paper, rough on one side, closely overlies a pack of cloth sheets to be cut, which cloth sheets are supported on an apertured support. The sealing surface sheet is less air-permeable than the cloth sheets and may simply be carried by the pack of cloth sheets, or such sealing surface sheet may be in the form of endless belts located on opposite sides of a cutting implement used for cutting the cloth sheets of the pack. The surface sheet is pressed firmly against the pack of cloth sheets by suction applied through apertures of the sheet pack support.

5 Claims, 2 Drawing Figures

METHOD OF AND APPARATUS FOR CUTTING TEXTILE MATERIAL

This application is a continuation-in-part of application Ser. No. 80,905, filed Oct. 15, 1970, for A Method of and Apparatus for Cutting Textile Material now abandoned.

The present invention relates to methods and apparatus for the automatic cutting of textile material and more particularly to such methods in which the fabric to be cut is held during the cutting operation on a porous or perforated support by means of suction.

Various devices have already been proposed for automatic cutting in which a cutting pattern, for instance in the form of a drawing, is followed manually (see U.S. Pat No. 1,596,943) or photoelectrically (see German specification No. 1,460,140) or in the form of a punched card or punched tape, (see U.S. Pat. No. 1,173,058) is used for cutting the material. In accordance with the type of device the fabric is caused to perform a controlled advancing movement in relation to the cutting element (see U.S. Pat. No. 3,304,820) by means of a driven fabric carrier. Alternatively the fabric can be mounted on a stationary carrier and the cutting tool carries out all movements necessary for cutting (see U.S. Pat. No. 3,245,295).

For machine cutting of fabric it is extraordinarily important that the cloth to be cut be held absolutely firmly during cutting, since otherwise a relative displacement of the cloth in relation to the template or pattern to be scanned controlling the cutting operation leads to mistakes in cutting. Conventionally the holding down of the material on the driven or stationary fabric support is carried out by means of suction. Although this method offers the advantage that the material can be held in a simple manner evenly and just where holding is required, that is to say in the cutting zone, the holding down of the material by means of suction depending to a considerable extent on the permeability to air of the textile material to be cut. Furthermore in the case of several superposed strips of cloth the uppermost material length is usually less effectively held than the lowermost. Although this disparity as regards the holding down can be overcome to a certain extent by regulating the air current, it is not possible to ensure that this can be carried out without substantially increasing the air flow and the necessary suction power. On cutting the cloth the material may be displaced by the cutting tool or also entrained.

One objection of the invention is to overcome these disadvantages and to achieve a satisfactory holding down of lengths of cloth during machine cutting in which the material is held by means of suction.

The present invention consists in a method for the automatic cutting of textile material in which the cloth is held by suction on an air-permeable support and is covered during cutting by a foil, i.e., a thin flimsy sheet, which, while not air-impermeable, has a substantially lesser air permeability than the material to be cut. With such a method the material is held down against the support for effectively gripping the air-permeable material to deter its movement away from the support, but the air-permeable material, but is not excessively compacted, irrespective of its permeability, and moreover the suction requirement is reduced. If a surface sheet extending all over the fabric is laid on the length of cloth to be cut and cut together with the length of cloth, the material is reliably held down evenly, including the zone immediately adjacent to the cutting tool. In order to avoid sliding of the surface sheet on the cloth, more particularly in the case of very smooth cloth to be cut, the length of material can be covered with a surface sheet whose side lying against the material has a rough surface.

Further details of the invention will be gathered from the following description referring to the accompanying drawings.

The method in accordance with the invention is based upon the fact that the holding down of lengths of material on an air permeable support by means of suction depends for its effectiveness on the air permeability of the material. The lesser the air permeability, the better the sucking action on the material and the better the material is held. As is known the air permeability of cloth varies considerably in accordance with whether it is of a fine or coarse material. Also the textile fiber plays a role. In the case of several lengths of material laid on top of one another the lowermost lengths of material are held down more firmly and the upper layers are held less firmly so that they may become displaced during cutting. The effect of this different permeability to air can be overcome in a very simple manner by applying a surface sheet foil, which is only scarcely or slightly permeable to air, to the length of material to be cut. In any case the foil must have a substantially lower air permeability than the lengths of material. The suction air stream flowing through the material draws the surface sheet against the cloth by suction so that the lengths of material are gripped between the surface sheet and the support. The suction action is thus reinforced and its efficacy is improved to such an extent that the suction air rate of flow can even be decreased. Even very open, almost netlike material can be held securely in this manner.

Figure 1:
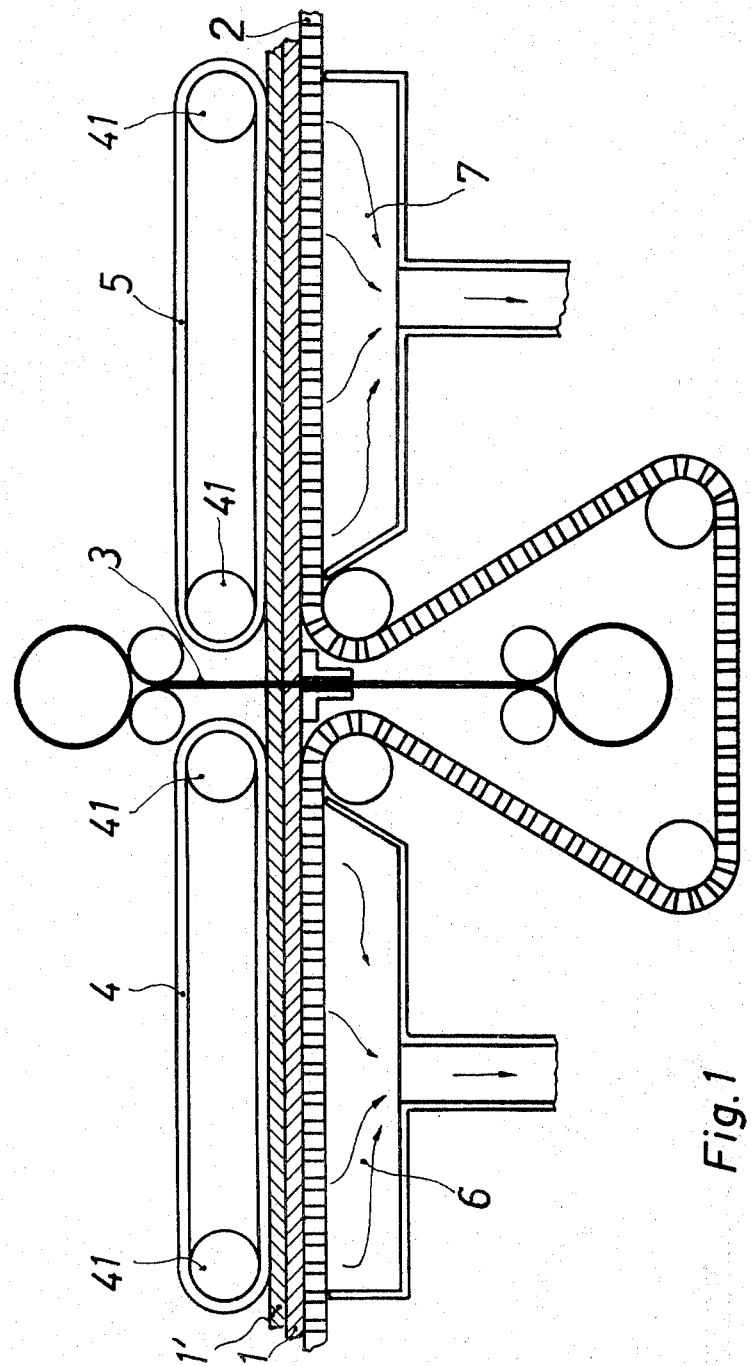
FIG. 1 shows the application of two endless surface sheets in accordance with the invention.

In accordance with an embodiment of the invention shown in FIG. 1, the lengths 1 and 1' of cloth are mounted on a perforated, that is to say air permeable, support 2 which performs a reciprocating movement for cutting feed in relation to the band knife 3. On each side of the knife 3 on top of the lengths of material foil belts 4 and 5 extending on guide rolls 41 are arranged. These foil belts can move with the lengths 1 and 1' of material to be cut. Stationary suction devices 6 and 7, which are arranged underneath the support 2, draw the foil belts onto the uppermost length 1' of material and both lengths 1 and 1' of material are accordingly held firmly on the support 2. Since the holding down is exclusively due to the surface sheets acted upon by the suction, undesired compacting or rucking of the cloth and also displacements of the material are avoided.

Figure 2:
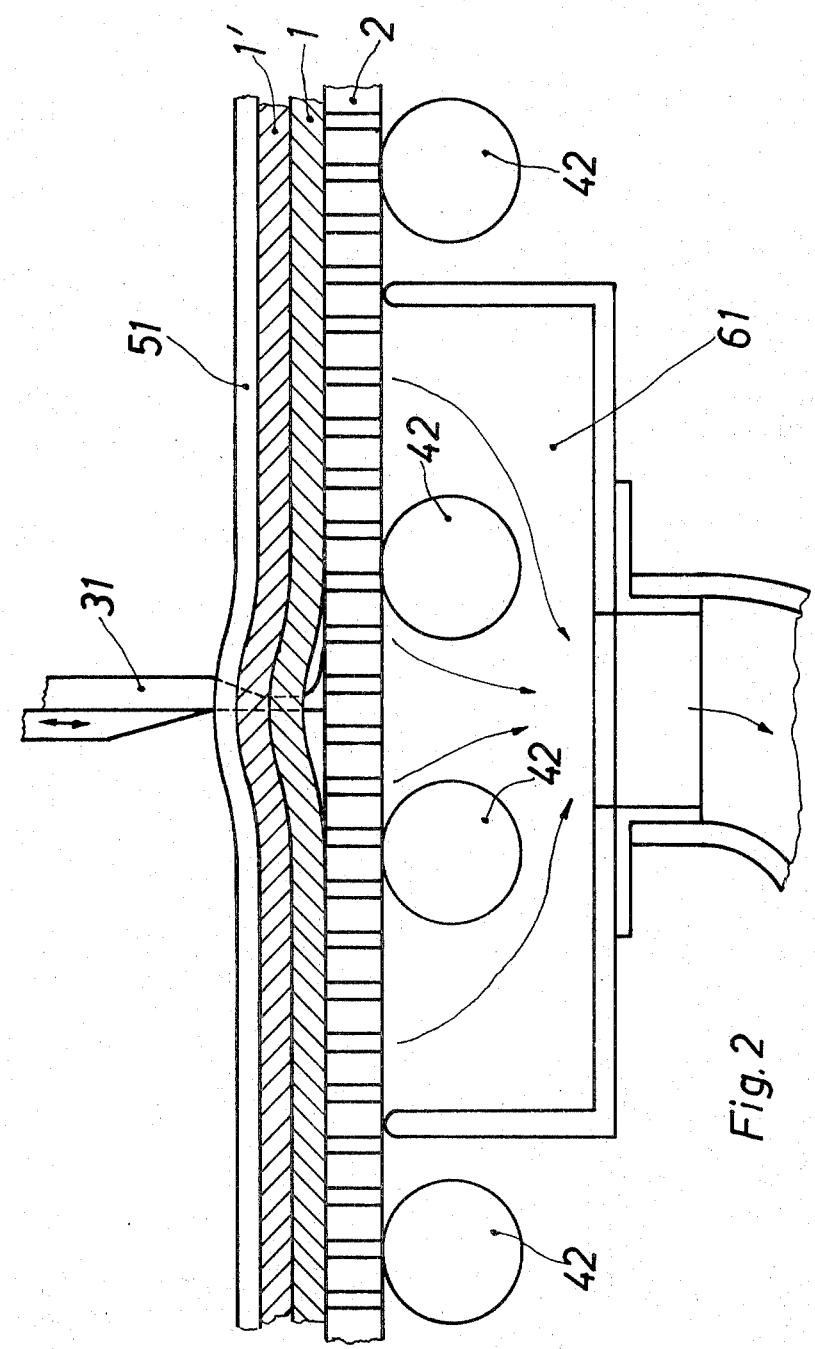
FIG. 2 shows the application of a surface sheet extending all over the fabric.

In accordance with the embodiment shown in FIG. 2 a foil 51 extending all over the fabric is arranged on the lengths 1 and 1' of material. At a position adjacent to the cutting tool 31 a suction device 61 is arranged underneath the support 2. The suction device serves to press down the length of material at a position immediately adjacent to the cutting tool 31 owing to the suction action on the surface sheet or foil. The support 2 is supported by sliding rolls 42. The foil 51 is cut together with the lengths 1 and 1' of material. A surface sheet which has been found to be particularly suitable for the purpose in hand is commerically available silk paper, that is to say special silk fabric No. 166 which is smooth on one side, rough on the other and has a weight of 20 g. per square metre. This silk paper is applied with its smooth side uppermost and with its rough side engaging the length 1' of material so that the silk paper lies against the cloth without any possibility of slipping. The holding down of the material during cutting is thus completely satisfactory even at a position immediately adjacent to the knife so that even cutting of complicated corners or narrow strips can be carried out without any defects. Cutting can always be exactly checked by the operator. Furthermore even several lengths of material on top of one another can be cut without displacement.

The method in accordance with the invention is applicable irrespective of the type of cutting device or other mechanical devices and irrespectively of whether the material support is moved or is stationary. This method can be used with success in all those cases in which the material is held on a support by means of suction and is cut by a knife tool or a punching tool. The method in accordance with the invention achieves an absolutely accurate automatic cutting in accordance with its pattern.

I claim:

1. In a method for cutting textile material automatically, the steps which comprise supporting air-permeable material on an air-permeable support, providing a slightly air-permeable surface sheet, less permeable than such air-permeable material, and having one rough side, and one smooth side placing such rough side of such slightly air-permeable sheet against the side of the air-permeable material opposite the support, applying suction to the support to draw the surface sheet against the air-permeable material and the air-permeable material against the support, and holding the upper surface of the air-permeable material by thus pressing the rough side of the surface sheet into contact with the upper surface of the air-permeable material to deter edgewise movement of the surface sheet relative to the air-permeable material and thus to deter edgewise movement of the air-permeable material relative to the support.

2. In the method defined in claim 1, the surface sheet being silk paper.

3. Apparatus for cutting textile material including an air-permeable support having one side for supporting air-permeable material to be cut, and suction means for applying suction to the side of the support opposite the side for supporting the air-permeable material, the improvement comprising a slightly air-permeable flimsy surface sheet, less permeable than the air-permeable material on the air-permeable support, overlying air-permeable material supported by the support and having a rough surface and a smooth surface disposed with said rough surface pressed into engagement with the side of the air-permeable material opposite the support by suction produced by the suction means, said surface of said surface sheet pressed into engagement with the air-permeable material being sufficiently rough as to hold said surface sheet and such side of the air-permeable material engaged thereby against relative sliding movement.

4. In the apparatus defined in claim 3, the surface sheet being silk paper.

5. In a method for cutting textile material automatically, the steps which comprise supporting air-permeable material on an air-permeable support, placing a surface sheet against the side of the air-permeable material opposite the support, such surface sheet being of material which is slightly air-permeable but having an air-permeability substantially less than that of such air-permeable material, and applying suction to the support and thereby drawing a substantial amount of air through the surface sheet and pressing the surface sheet against the air-permeable material sufficiently firmly to hold the air-permeable material down against the support for effectively gripping the air-permeable material to deter its movement away from the support without excessively compacting the air-permeable material.

* * * * *

PO-1050
(5/69)

UNITED STATES PATENT OFFICE
CERTIFICATE OF CORRECTION

Patent No. 3,797,341  Dated March 19, 1974

Inventor(s) Bruno Bystron

It is certified that error appears in the above-identified patent and that said Letters Patent are hereby corrected as shown below:

Column 3, line 33, after "side" (first instance) cancel the comma; same line, after "side" (second instance) insert a comma.

Signed and sealed this 11th day of February 1975.

(SEAL)
Attest:

RUTH C. MASON
Attesting Officer

C. MARSHALL DANN
Commissioner of Patents
and Trademarks